(12) United States Patent
Praefcke et al.

(10) Patent No.: US 7,933,999 B2
(45) Date of Patent: Apr. 26, 2011

(54) METHOD AND DEVICE FOR CONTROLLING HAVI STANDARD DEVICES BY DEVICE CONTROL MODULES OF AN OSGI PLATFORM

(75) Inventors: Werner Praefcke, Hildesheim (DE); Thomas Eymann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1108 days.

(21) Appl. No.: 10/494,470

(22) PCT Filed: Nov. 8, 2003

(86) PCT No.: PCT/DE03/03712
§ 371 (c)(1), (2), (4) Date: May 3, 2004

(87) PCT Pub. No.: WO2004/068792
PCT Pub. Date: Aug. 12, 2004

(65) Prior Publication Data
US 2004/0267950 A1 Dec. 30, 2004

(30) Foreign Application Priority Data

Jan. 24, 2003 (DE) .................................. 103 02 678

(51) Int. Cl.
*G06F 15/16* (2006.01)
(52) U.S. Cl. ........ 709/227; 709/223; 709/228; 709/229; 709/230
(58) Field of Classification Search .................. 709/223, 709/227–229, 230
See application file for complete search history.

(56) References Cited

U.S. PATENT DOCUMENTS

| | | | |
|---|---|---|---|
| 6,963,925 B1 | 11/2005 | Ishikawa et al. | |
| 2001/0032273 A1* | 10/2001 | Cheng | 709/249 |
| 2002/0073244 A1* | 6/2002 | Davies et al. | 709/328 |
| 2002/0083143 A1* | 6/2002 | Cheng | 709/208 |
| 2002/0133576 A1* | 9/2002 | Koymans et al. | 709/221 |
| 2003/0046437 A1* | 3/2003 | Eytchison et al. | 709/250 |
| 2003/0149811 A1* | 8/2003 | Lee et al. | 710/33 |
| 2003/0200340 A1* | 10/2003 | Hutter | 709/250 |
| 2003/0219127 A1* | 11/2003 | Russ et al. | 380/239 |
| 2004/0246992 A1* | 12/2004 | Henry et al. | 370/467 |

(Continued)

FOREIGN PATENT DOCUMENTS

JP 2001007861 1/2001

(Continued)

OTHER PUBLICATIONS

Baier R., et al: "Multimedia Middleware for the Future Home" ACM Multimedia 2001 Workshops, International Workshop on Multimedia Middleware, Ottawa, Canada, Oct. 5, 2001, pp. 48-51.

(Continued)

*Primary Examiner* — Mohamed Wasel
(74) *Attorney, Agent, or Firm* — Michael J. Striker

(57) ABSTRACT

A new method permits the automatic requesting and provision of device control modules (DCMs) based on the HAVi standard by means of an OSGi platform, in particular, Java DCMs should be established and made available to the entire network, which make it possible to control HAVi devices. At least one device control module of the HAVi network is represented by a device control module of an OSGi platform, and according to the invention, the control of at least one HAVi device occurs by a device control module of an OSGi platform represented in the HAVi network or by a device control module native to the HAVi network.

14 Claims, 3 Drawing Sheets

U.S. PATENT DOCUMENTS

| | | | |
|---|---|---|---|
| 2005/0066024 A1* | 3/2005 | Crocitti et al. ................ | 709/223 |
| 2005/0256962 A1* | 11/2005 | Mischler et al. .............. | 709/230 |
| 2005/0272469 A1* | 12/2005 | Lee et al. ...................... | 455/557 |
| 2007/0112909 A1* | 5/2007 | Miyamoto et al. ............ | 709/200 |
| 2007/0147396 A1* | 6/2007 | Lee et al. ...................... | 370/401 |
| 2008/0091776 A1* | 4/2008 | Miyamoto .................... | 709/203 |

FOREIGN PATENT DOCUMENTS

| WO | 01 19032 A | 3/2001 |
|---|---|---|

OTHER PUBLICATIONS

Zahariadis, T,. et al: "Miltimedia Home Networks: . . . " Computer Standards and Interaces, Elsevier Sequoia, Lausanne, CH, BD. 24, NR. 5, Nov. 2002, pp. 425-435.

Condry, M., et al: "Open Service Gateway Architecture Overview" Industrial Electronics Society, 1999, IECON' 99 Proceedings, The 25th Annual Conference of the IEEE San Jose, CA, USA, Nov. 29-Dec. 3, 1999, pp. 735-742.

* cited by examiner

METHOD AND DEVICE FOR CONTROLLING HAVI STANDARD DEVICES BY DEVICE CONTROL MODULES OF AN OSGI PLATFORM

CROSS-REFERENCE TO A RELATED APPLICATION

The invention described and claimed hereinbelow is also described in German Patent Application DE 10 302 678.9 filed on Jan. 24, 2003. This German Patent Application, provides the basis for a claim of priority of invention under 35 U.S.C. 119(a)-(d).

BACKGROUND OF THE INVENTION

The invention relates to a method and an apparatus for controlling devices based on the HAVi standard (HAVi devices) by means of device control modules in an OSGi platform.

The IEEE (Institute of Electrical and Electronics Engineers, Inc.) is an international organization that, among other things, develops standards for electronic networks. IEEE 1394 is a serial bus system of the IEEE in which a variety of terminals (so-called nodes) are interconnected by means of either an electrical cable or an optical waveguide. A node can either be embodied as a terminal (a so-called leaf) or as a relay node (a so-called branch). The uppermost node is referred to as a root. The use of the different node types permits a suitable topology to be designed for a network. A leaf receives data packets and processes them if the target address of the packet coincides with its own. A branch must also transmit all packets that it receives at one port to all of the other ports.

According to IEEE 1394, the network is self-configuring, i.e. after being switched on or after a reset, all nodes transmit selected data about themselves into the network. These data are received by all nodes. A node can be designed in such a way that it can also take on additional administrative functions for the network (bus management). To that end, it collects all of the data regarding the other nodes, processes these data, and stores them internally in a suitable fashion. If a number of nodes have bus management capabilities, then a competition process is initiated from which one node emerges as the winner that then executes the bus management.

In addition to the methods described in the specifications of IEEE 1394, there is a bus-independent modification that has been specified under the name "home audio video interoperability" (HAVi) by a consortium of companies. HAVi is primarily conceived for use in an IEEE 1394 network and refers both to the sum of all devices that are controlled by one or more HAVi-based nodes within a closed network context using the methods described in the HAVi standard, and also to the network infrastructure required for this. Parts of the HAVi network can also be designed as devices without inherent HAVi functionality (so-called legacy devices). It is typical for HAVi networks to use high-speed network technologies (for example IEEE 1394, MOST, Ethernet; WLAN).

In particular, the HAVi specification describes the remote control of devices and/or functions of devices from any other point in the network.

To that end, a distributed model is described in which the control of the devices is executed by means of control modules, so-called "device control modules" (DCMs or DCM). Such a DCM runs as a software element (SE) on the device that is to execute the control functions in another device. Each DCM is specifically intended for a particular device or device class.

HAVi is based on the modular concept for a distributed system. The individual modules are represented by the software elements (SE). All SEs in the system have unique addresses. In most cases, SEs can be placed in both a central and a distributed arrangement. That is, there is a whole range of possible implementations, from an implementation with only one instance of a particular software element (for example a stream manager) to an implementation that provides such an instance in each device.

The so-called messaging system (MS) connects all of the SEs of a network to one another. As a rule, a network based on the HAVi standard (HAVi network) has the following SEs:

The registry contains data about every SE available in the network and about every available device and every available function. Data about the individual SEs are stored in the attributes. In addition to the predefined attributes, it is possible to add additional data. The architecture of the registry represents a distributed system i.e. each device can contain a part of the total registry; however, the registry can also be centrally located. The access to the registry is invisible since the various instances of the registry within the network automatically exchange the required data as needed.

The stream manager (SM) handles the establishment, disconnection, and administration of isochronous multimedia connections (audio data, video data) between SEs and/or devices. Like the registry, the SM can be embodied as a distributed system. Special commands are used to obtain the status of all of the SMs or of a particular SM.

Messages regarding status changes in the system are conveyed to the communication participants by the event manager.

The resource manager executes the allocation and freeing of resources (devices, SEs) and stores scheduled events (for example recordings executed by the video recorder).

The DCM manager (DM) is responsible for installing and uninstalling DCMs in correspondingly suitable devices. This makes it possible to provide a standardized method for installing DCMs in Java bytecode format. An installation of native code (binary) is not described in the standard, but can be added as a proprietary embodiment. If a number of HAVi devices with DMs are contained in a HAVi network, then there is a DM leader. In the event that a number of suitable DCMs are found for a newly added device, this DM leader decides which DCM is to be installed. The remaining DMs are referred to as DM followers.

A functional control module (FCM) is an SE that is used to control a functional unit of a device (for example a CD player or an FM tuner). A DCM (device control module) is thus comprised of the basic functions common to all DCMs and device-specific FCMs. These or the modules respectively required in a device constitute a standard application interface. This standard interface achieves an interoperability between applications and devices from different manufacturers (interoperability API).

The devices connected in a HAVi network belong to one of four possible categories. Among other things, these devices differ with regard to the availability of the above-described software elements. FAV (full audio video) devices and IAV (intermediate audio video) devices are device classes that have control possibilities. They can be used to control functionalities in other FAV and IAV devices as well as in BAV (base audio video) and LAV (legacy audio video) devices, which only function as controlled devices.

An FAV device has all of the above-mentioned SEs. In particular, it has a Java runtime environment, which can be used to dynamically install DCMs for devices that are newly added to the network.

An IAV device has a limited functionality. SMs, DMs, and RMs are not obligatory. Because the Java runtime environment is also missing, it is only possible to control devices that already have DCMs.

A BAV device cannot control any other devices, but provides a Java DCM, which, when installed on an FAV, serves to control the inherent functionality. In addition to this Java DCM, a BAV has no other HAVi SEs. The BAV device can transmit a Java DCM to an FAV device and this Java DCM is used therein to control the inherent functionality by means of a non-fixed protocol.

An LAV device is also a controllable device, but is not able to provide a Java DCM. The LAV device must already be precisely known to the controlling device (FAV or IAV device) in order to transmit the HAVi instructions in the form of commands that it will accept.

The open service gateway initiative (OSGi) is a non-commercial organization in which over 80 companies participate worldwide. The organization is involved in the development of a specification for a service platform in which services can be loaded for their runtime, activated, and unloaded again. The services are processed in the form of packets that are referred to as bundles. The particular feature of the platform is that it permits interaction between the modules of individual services comprised of different packets. The interoperability is achieved through the standardization of interfaces by the OSGi organization. In addition, the platform should permit access to devices connected in the local network and should support a connection to the global network (WAN). OSGi does not define the establishment of device connections and networks, but makes use of existing standards and abstracts them to the application plane on a functional basis by means of an interface specification. In addition, all administrative operations can also be executed remotely by means of a network connection. The design and specification of the service platform uses the service-supporting software technology Java.

The OSGi standard does not provide any mechanism for controlling devices of a HAVi network (HAVi devices) by means of DCMs of the OSGi framework. This would, however, be desirable since an OSGi platform can offer a more extensive and more flexible selection of possible device control modules (DCMs).

SUMMARY OF THE INVENTION

The object of the current invention, therefore, is to disclose a method that permits the automatic requesting and provision of DCMs based on the HAVi standard by means of an OSGi platform. In particular, OSGi DCMs should be produced and made available to the entire network, by means of which HAVi devices can be controlled. These OSGi DCMs can be embodied both in Java bytecode and in native code. An apparatus for executing the method according to the invention should also be disclosed.

In keeping with these objects and with others which will become apparent hereinafter, one feature of the present invention resides, briefly stated, method for controlling an HVAi device (20) in an HAVi network using a device control module (13) on an OSGi platform, where the HAVi network has a messaging system (16), a registry, a stream manager, an event manager, a resource manager, an HAVi device (20) and a DM leader (10), characterized in that the DM leader (10) in the HAVi network uses a DM client (12) with parallel and synchronous operation on the OSGi platform to search for available device control modules (13) on the OSGI platform and records device control modules (13) which are available within the OSGi platform as device control modules which are available within the HAVi network, a recorded device control module (13) is selected by the DM leader (10), this selected device control module (13) registers with the HAVi messaging system (16) and with the registry of the HAVi network for the purpose of controlling the HAVi device (20), and is allocated a software element identification (SEID), and the HAVi device (20) is controlled by the OSGi platform's device control module (13) registered in the HAVi network.

Another feature of the present invention resides, briefly stated, in an apparatus for controlling an HVAi device (20) in an HAVi network using a device control module (13) on an OSGi platform, where the HAVi network has a messaging system (16), a registry, a stream manager, an event manager, a resource manager, an HAVi device (20) and a DM leader (10), characterized in that the DM leader (10) in the HAVi network uses a DM client (12) with parallel and synchronous operation on the OSGi platform to search for available device control modules (13) on the OSGI platform and records device control modules (13) which are available within the OSGi platform as device control modules which are available within the HAVi network, a recorded device control module (13) is selected by the DM leader (10), this selected device control module (13) registers with the HAVi messaging system (16) and with the registry of the HAVi network for the purpose of controlling the HAVi device (20), and is allocated a software element identification (SEID), and the HAVi device (20) is controlled by the OSGi platform's device control module (13) registered in the HAVi network.

The invention is based on the idea of extending the DM into the OSGi plane so that this extended DM is able to detect all functions, for example searching, selection, installation, and administration of DCMs (device control modules), within both the HAVi network and the OSGi platform.

To this end, at least one device control module of the HAVi network is represented by a device control module of an OSGi platform. The use of the DCMs of the OSGi platform as DCMs of the HAVi network allows these DCMs to also be made available to the HAVi network. According to the invention, the control of at least one HAVi device is executed by means of a device control module of an OSGi platform represented in the HAVi network or by means of a DCM native to the HAVi network. The available device control modules of the OSGi platform can be used as device control modules of the HAVi network by depicting the available device control modules of the OSGi platform in an OSGi DM client provided for this purpose in the OSGi platform and by connecting the OSGi DM client to the HAVi DM and supporting DCM searches by the OSGi DM client. According to the invention, when a HAVi device is added, the search of the HAVi DM for suitable DCMs is extended to include the OSGi DM client. Because a synchronously running OSGi DM client is set aside for the HAVi DM (DCM manager of the HAVi network), DCMs can be consulted optionally with the aid of conventional HAVi mechanisms, for example as Java DCMs, or by means of OSGi mechanisms. It is therefore possible to offer a more extensive and more flexible selection of DCMs.

In particular it is possible to execute a subsequent, externally controlled updating of DCMs already in operation for the entire HAVi network.

The notification in the HAVi network as to the presence of the device control modules of the OSGi platform that are depicted in the OSGi DM client preferably occurs by connecting DMs of the HAVi network to the OSGi DM client of the OSGi platform. The OSGi DM client of the OSGi platform is thus connected to the DM leader of the HAVi network if the HAVi network has a number of DMs. In addition, the OSGi DM client makes its device control module available to the DM of the HAVi network.

According to the invention, changes regarding available device control modules of the OSGi DM client are communicated to the HAVi DM leader. A device control module of the OSGi platform is advantageously processed in bundle form in the OSGi platform.

The communication of the HAVi network with a device control module of the OSGi platform preferably occurs via an MS adaptation layer.

Also according to the invention, the OSGi DM client notifies the OSGi device access service when new devices are added and a device control module of the OSGi platform logs onto the registry of the HAVi network.

An apparatus according to the invention for controlling HAVi devices by means of device control modules of an OSGi platform is characterized in that it has means for representing at least one device control module of a HAVi network by means of a device control module of an OSGi platform.

BRIEF DESCRIPTION OF THE DRAWINGS

Exemplary embodiments of the invention will be explained in detail below in conjunction with the accompanying drawings.

PREFERRED EMBODIMENT OF THE INVENTION

Figure 1:
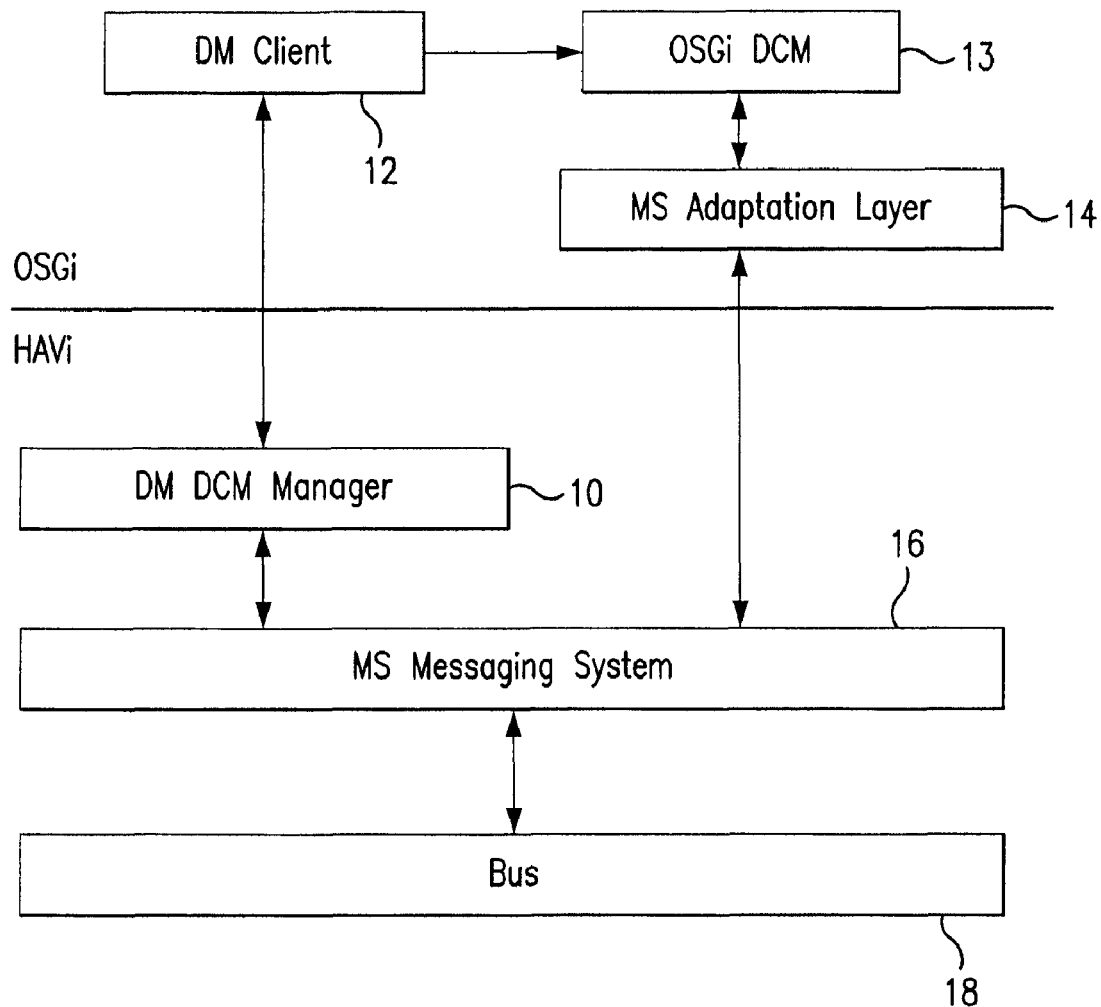
FIG. 1 is a schematic depiction of a HAVi network and an OSGi platform.

FIG. 1 is a schematic depiction of a HAVi network and an OSGi platform. The HAVi network has a DCM manager 10 (DM), a messaging system 16 (MS), and a bus 18. The HAVi network also has a stream manager, an event manager, a registry, and a resource manager, which are not shown in FIG. 1 for the sake of clarity. According to the invention, the OSGi framework has a DM client 12 that runs synchronously with the DM 10 and has an MS adaptation layer 14.

According to the invention, control-capable HAVi devices, i.e. FAV devices or IAV devices, communicate with the OSGi platform—except for the direct connection between the DM 10 and the OSGi DM client 12—via an MS adaptation layer 14, which represents the sole access to the HAVi system for OSGi components. If a HAVi FAV device is added to the HAVi network and there is at least one DCM manager in the network, then a new DM leader is established.

On the OSGi plane, an OSGi DM client 12 is set aside for the DM 10. This DM client 12 is started as a bundle under OSGi. The DM client 12 and the DM 10 run in parallel and synchronously. If a device is connected to the network, it is identified by the DM leader. The DM leader also queries all DM followers in the network as to the presence of suitable DCMs (device control modules). Since the DM 10 has an OSGi DM client 12, then the search for possible DCMs (in Java) is also carried out in the OSGi framework. This allows additional DCMs to be made available for the FAV devices and IAV devices of the HAVi network.

If the DM leader 10 selects an OSGi DCM 13, then this starts as an OSGi bundle. The OSGi DCM 13 logs onto the HAVi messaging system 16 and is assigned a software element identification (SEID) and logs onto the registry of the HAVi network (not shown). In any case, the DM client 12 connects the new device to the OSGi device access service (not shown) in order to make it accessible to the OSGi system via a corresponding base driver (not shown).

Figure 2:
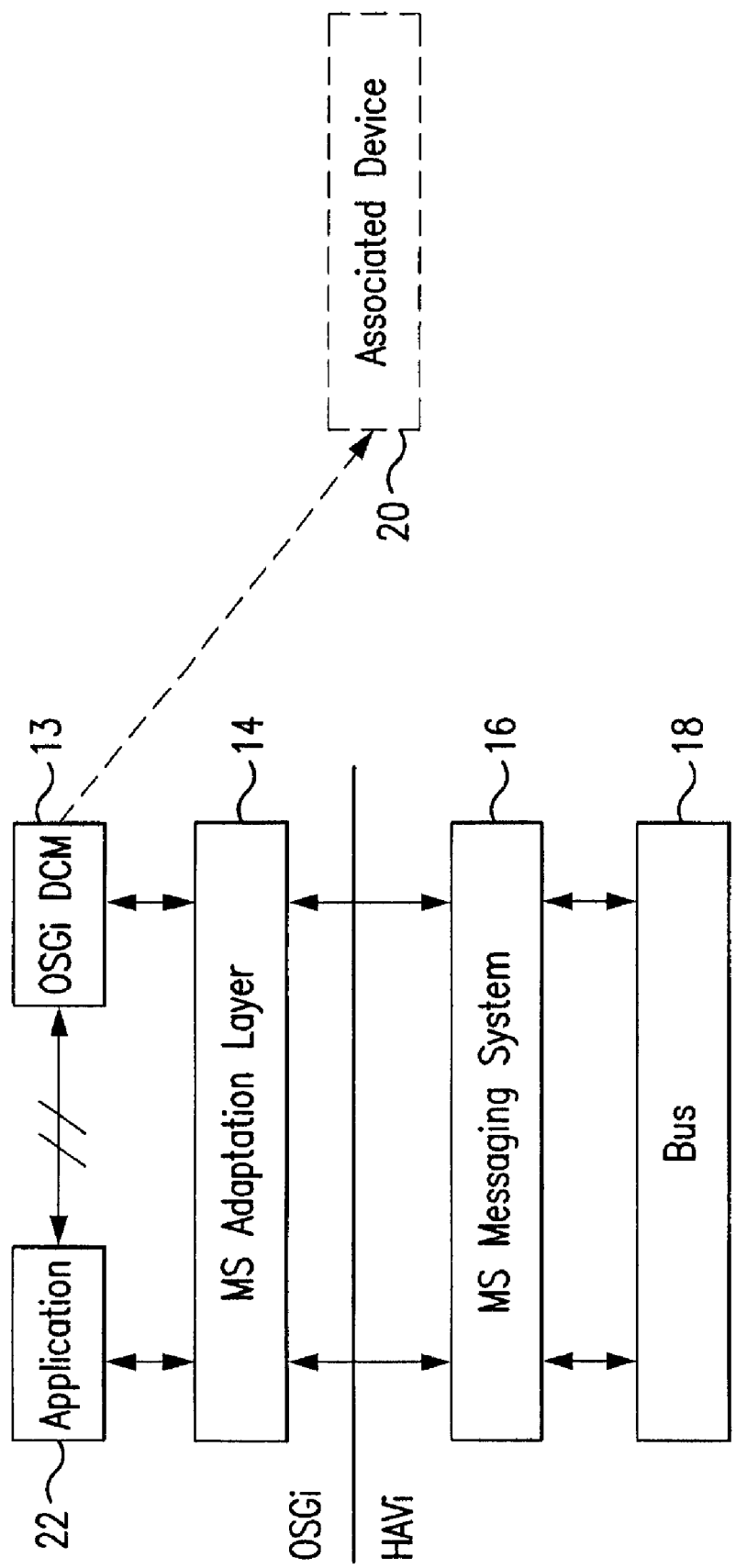
FIG. 2 is a schematic depiction of a control of a HAVi device by means of a DCM of an OSGi platform.

FIG. 2 is a schematic depiction of a control of a HAVi device by means of a DCM of an OSGi platform.

The OSGi DCM 13 communicates exclusively with the messaging system 16. As a result, the reservation by means of an application 22 occurs in full conformity with the HAVi standard. It is thus unknown to an application 22 whether it is controlling a HAVi DCM or an OSGi DCM. The OSGi DCM 13 accepts requests from the messaging system 16 and is therefore available in the entire HAVi network. The communication between the DCM 13 and the associated device 20 is implementation-dependent and is hidden from the application 22. A Java application 22 that seeks to control a HAVi device therefore uses the HAVi messaging system 16 exclusively. In particular, it has no direct connection to the DCM 13, not even if the DCM 13 is installed in the same Java environment. If need be, the HAVi messaging system 16 forwards the commands to the OSGi DCM 13.

Figure 3:
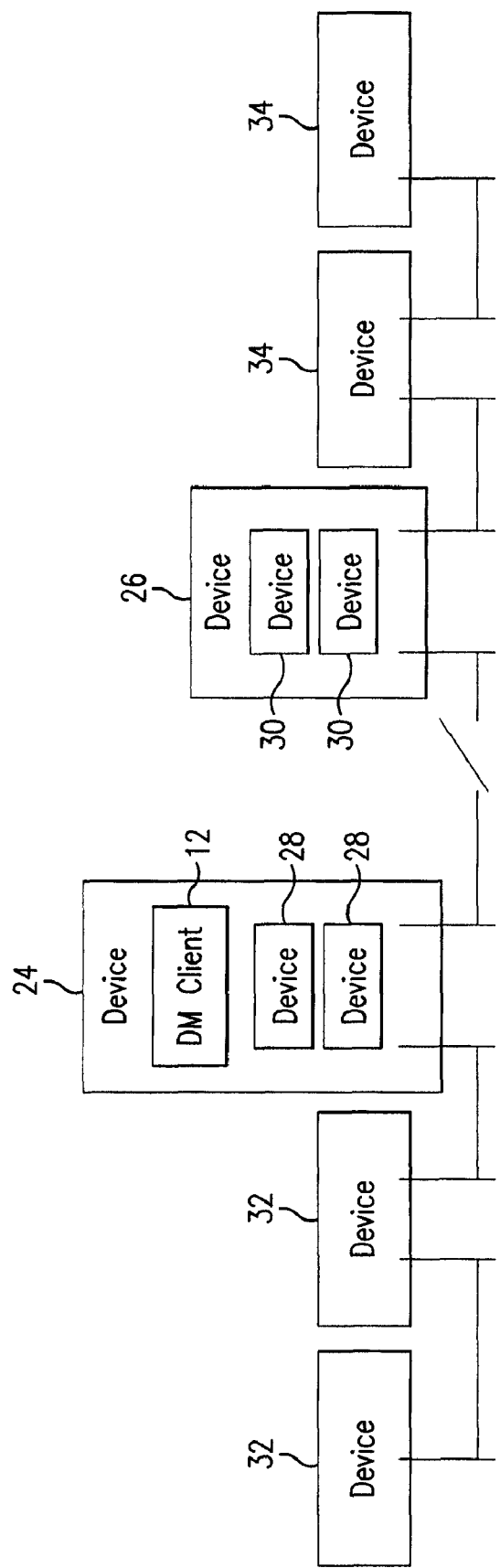
FIG. 3 is a schematic depiction of two HAVi networks.

FIG. 3 is a schematic depiction of two HAVi networks. The starting point is two autonomous HAVi networks with devices (the first network being comprised of 12, 24, 28, and 32; the second network being comprised of 26, 30, and 34 as well as other components, not shown, such as a DCM manager, a stream manager, an event manager, a registry, and a resource manager), whose DCMs 28, 30 are already active. If the two subnetworks are combined to form an overall network, then there is no need to search for new DCMs. In OSGi, the added devices from the new subnetwork would therefore remain undetected. The OSGi DM client 12 is therefore also responsible in this case for notifying the OSGi device access service (not shown) of the addition of new devices. In the example given, these new devices are the devices 34. If need be, this also triggers the installation of an OSGi base driver.

The invention claimed is:

1. A method for controlling an HAVi device (20) in an HAVi network using a device control module (13) on an OSGi platform, where the HAVi network has a messaging system (16), a registry, a stream manager, an event manager, a resource manager, an HAVi device (20) and a DM leader (10),
    characterized in that the DM leader (10) in the HAVi network uses a DM client (12) with parallel and synchronous operation on the OSGi platform to search for available device control modules (13) on the OSGI platform and records device control modules (13) which are available within the OSGi platform as device control modules which are available within the HAVi network, a recorded device control module (13) is selected by the DM leader (10), this selected device control module (13) registers with the HAVi messaging system (16) and with the registry of the HAVi network for the purpose of controlling the HAVi device (20), and is allocated a software element identification (SEID), and the HAVi device (20) is controlled by the OSGi platform's device control module (13) registered in the HAVi network.

2. The method according to claim 1, characterized in that the control of at least one HAVi device (20) is executed by means of a device control module (13) of an OSGi platform represented in the HAVi network.

3. The method according to claim 1, characterized in that the representation of at least one device control module of the HAVi network is executed by means of a device control module (13) of the OSGi platform by depicting the available device control modules (13) of the OSGi platform in an OSGi DM client (12) provided for this in the OSGi platform, connecting the OSGi DM client (12) to the HAVi DM (10), and supporting the DCM search by the OSGi DM client (12).

4. The method according to claim 3, characterized in that when a new HAVi device (20, 32, 34) is added, the search of the HAVi DM (10) for suitable DCMs (13, 28, 30) is extended to include the OSGi DM client (12).

5. The method according to claim 1, characterized in that upon selection of an OSGi DCM (13) by the HAVi DM (10), the announcement of the OSGi DCM (13) in the HAVi network occurs through an automatic entry of the OSGi DCM (13) into the HAVi registry.

6. The method according to claim 3, characterized in that the OSGi DM client (12) of the OSGi platform is connected to the DM leader of the HAVi network via the local HAVi DM (10) if the HAVi network has a number of DMs (10).

7. The method according to claim 3, characterized in that the device control module (13) of the OSGi DM client (12) is made available to the HAVi DM (10).

8. The method according to claim 3, characterized in that the HAVi DM (10) is notified of changes in the available device control modules (13) of the OSGi DM client (12).

9. The method according to claim 1, characterized in that a device control module (13) of the OSGi platform is processed in bundle form in the OSGi platform.

10. The method according to claim 1, characterized in that a device control module (13) of the OSGi platform communicates with the HAVi network via an MS adaptation layer (14) in order to control a HAVi device (20, 32, 34).

11. The method according to claim 3, characterized in that the OSGi DM client (12) is notified of an addition of new devices (34) for which DCMs (30) are already registered in the HAVi network.

12. The method according to claim 3, characterized in that the OSGi DM client (12) notifies the OSGi device access service of the addition of new devices (34).

13. The method according to claim 1, characterized in that when a new HAVi device (20, 32, 34) arrives the search by the HAVi DM (10) for suitable DCMs (13, 28, 30) is extended to the OSGi DM client (12).

14. A HAVi network apparatus, for controlling an HAVi device (20) in an HAVi network using a device control module (13) on an OSGi platform, comprising a messaging system (16), a registry, a stream manager, an event manager, a resource manager, an HAVi device (20) and a DM leader (10),
characterized in that the DM leader (10) in the HAVi network uses a DM client (12) with parallel and synchronous operation on the OSGi platform to search for available device control modules (13) on the OSGI platform and records device control modules (13) which are available within the OSGi platform as device control modules which are available within the HAVi network, a recorded device control module (13) is selected by the DM leader (10), this selected device control module (13) registers with the HAVi messaging system (16) and with the registry of the HAVi network for the purpose of controlling the HAVi device (20), and is allocated a software element identification (SEID), and the HAVi device (20) is controlled by the OSGi platform's device control module (13) registered in the HAVi network.

\* \* \* \* \*